US010599769B2

(12) United States Patent
Osbourne et al.

(10) Patent No.: US 10,599,769 B2
(45) Date of Patent: Mar. 24, 2020

(54) TEXT CATEGORIZATION USING NATURAL LANGUAGE PROCESSING

(71) Applicant: Capital One Services, LLC, McLean, VA (US)

(72) Inventors: Jon Austin Osbourne, Frisco, TX (US); Aaron Raymer, The Colony, TX (US); Megan Yetman, Arlington, VA (US); Venkat Yashwanth Gunapati, Herndon, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/019,021

(22) Filed: Jun. 26, 2018

(65) Prior Publication Data

US 2019/0340235 A1    Nov. 7, 2019

Related U.S. Application Data

(60) Provisional application No. 62/665,467, filed on May 1, 2018.

(51) Int. Cl.
*G06F 17/27* (2006.01)
*G06N 5/04* (2006.01)
(Continued)

(52) U.S. Cl.
CPC ............ *G06F 17/277* (2013.01); *G06F 16/35* (2019.01); *G06K 9/6256* (2013.01); *G06N 5/046* (2013.01); *G10L 19/083* (2013.01)

(58) Field of Classification Search
CPC .... G06K 9/66; G06K 9/6256; G06F 3/04842; G06F 17/277; G06F 16/35; G10L 15/22; G10L 19/083; G06N 5/046
See application file for complete search history.

(56) References Cited

U.S. PATENT DOCUMENTS 9,240,184 B1 * 1/2016 Lin ................... G10L 15/142
9,767,182 B1 * 9/2017 Thakur ............ G06F 17/30598
(Continued)

OTHER PUBLICATIONS

Peng Zhou et al., "Text Classification Improved by Integrating Bidirectional LSTM with Two-dimensional Max Pooling", http://www.aclweb.org/anthology/C16-1329, Nov. 22, 2016, 11 pages.*
(Continued)

*Primary Examiner* — Fariba Sirjani
(74) *Attorney, Agent, or Firm* — Harrity & Harrity, LLP

(57) ABSTRACT

A method performed by a device may include identifying a plurality of samples of textual content; performing tokenization of the plurality of samples to generate a respective plurality of tokenized samples; performing embedding of the plurality of tokenized samples to generate a sample matrix; determining groupings of attributes of the sample matrix using a convolutional neural network; determining context relationships between the groupings of attributes using a bidirectional long short term memory (LSTM) technique; selecting predicted labels for the plurality of samples using a model, wherein the model selects, for a particular sample of the plurality of samples, a predicted label of the predicted labels from a plurality of labels based on respective scores of the particular sample with regard to the plurality of labels and based on a nonparametric paired comparison of the respective scores; and providing information identifying the predicted labels.

20 Claims, 5 Drawing Sheets

(51) Int. Cl.
  *G10L 19/083* (2013.01)
  *G06K 9/62* (2006.01)
  *G06F 16/35* (2019.01)

(56) References Cited

U.S. PATENT DOCUMENTS

| | | | | |
|---|---|---|---|---|
| 9,799,327 | B1* | 10/2017 | Chan | G10L 15/16 |
| 9,881,003 | B2* | 1/2018 | Hartrell | G06F 17/2836 |
| 9,959,272 | B1* | 5/2018 | Čaněk | G06F 17/2836 |
| 10,380,236 | B1* | 8/2019 | Ganu | G06F 17/277 |
| 2007/0288451 | A1* | 12/2007 | Meyer | G06F 17/30616 |
| 2009/0204605 | A1* | 8/2009 | Bai | G06F 17/30654 |
| 2012/0245924 | A1* | 9/2012 | Brun | G06F 17/2745 704/9 |
| 2012/0302925 | A1* | 11/2012 | Craelius | A61B 5/1107 600/595 |
| 2013/0311954 | A1* | 11/2013 | Minkkinen | G06F 3/04812 715/862 |
| 2016/0210551 | A1* | 7/2016 | Lee | G06F 17/27 |
| 2016/0378195 | A1* | 12/2016 | Lefebvre | G06F 3/017 382/156 |
| 2017/0091313 | A1* | 3/2017 | Chalabi | G06N 20/00 |
| 2017/0124447 | A1* | 5/2017 | Chang | G06F 17/2765 |
| 2017/0147910 | A1* | 5/2017 | Mao | G06N 3/0454 |
| 2017/0293638 | A1* | 10/2017 | He | G06F 17/30253 |
| 2017/0300565 | A1* | 10/2017 | Calapodescu | G06F 16/353 |
| 2017/0352344 | A1* | 12/2017 | Berg-Kirkpatrick | G10L 13/10 |
| 2017/0357720 | A1* | 12/2017 | Torabi | G06F 17/30769 |
| 2018/0082197 | A1* | 3/2018 | Aravamudan | G16B 50/00 |
| 2018/0131645 | A1* | 5/2018 | Magliozzi | H04L 51/02 |
| 2018/0137390 | A1* | 5/2018 | Brundage | G06K 9/00624 |
| 2018/0157640 | A1* | 6/2018 | Chung | G06F 17/2775 |
| 2018/0157743 | A1* | 6/2018 | Hori | G06F 17/30705 |
| 2018/0196873 | A1* | 7/2018 | Yerebakan | G06F 17/30713 |
| 2018/0196881 | A1* | 7/2018 | Lundin | G06N 3/0445 |
| 2018/0203848 | A1* | 7/2018 | Perez | G06F 17/2785 |
| 2018/0225281 | A1* | 8/2018 | Song | G06F 17/2785 |
| 2018/0341876 | A1* | 11/2018 | Ghosh | G06N 5/04 |
| 2018/0349477 | A1* | 12/2018 | Jaech | G06F 16/3334 |
| 2019/0147455 | A1* | 5/2019 | Wang | G06N 3/0427 707/723 |
| 2019/0156206 | A1* | 5/2019 | Graham | G06F 16/90335 |
| 2019/0156210 | A1* | 5/2019 | He | G06N 3/0454 |
| 2019/0236148 | A1* | 8/2019 | DeFelice | G06F 17/2881 |
| 2019/0340235 | A1* | 11/2019 | Osbourne | G06F 17/277 |
| 2019/0347329 | A1* | 11/2019 | Hewitt | G06F 17/2755 |

OTHER PUBLICATIONS

Hendrik J. Weideman, "Quantifying Uncertainty in Neural Networks", https://hjweide.github.io/quantifying-uncertainty-in-neural-networks, Jan. 23, 2018, 7 pages.

Nitish Srivastava et al., "Paper Review: Dropout: A Simple Way to Prevent Neural Networks from Overfitting", https://medium.com/paper-club/paper-review-dropout-a-simple-way-to-prevent-neural-networks-from-overfitting-4f25e8f2283a, Sep. 25, 2018, 15 pages.

Bonggun Shin et al., "Lexicon Integrated CNN Models with Attention for Sentiment Analysis", https://arxiv.org/pdf/1610.06272.pdf, Aug. 22, 2018, 10 pages.

Yoon Kim, "Convolutional Neural Networks for Sentence Classification", https://arxiv.org/pdf/1408.5882.pdf, Sep. 3, 2018, 6 pages.

Sepp Hochreiter et al., "Long Short-Term Memory", http://www.bioinf.jku.at/publications/older/2604.pdf, 1997, 32 pages.

Chunting Zhou et al., "A C-LSTM Neural Network for Text Classification", https://arxiv.org/pdf/1511.08630.pdf, Nov. 30, 2018, 10 pages.

Yarin Gal et al., "Dropout as a Bayesian Approximation: Representing Model Uncertainty in Deep Learning", https://arxiv.org/pdf/1506.02142.pdf, Oct. 4, 2016, 12 pages.

* cited by examiner

TEXT CATEGORIZATION USING NATURAL LANGUAGE PROCESSING

RELATED APPLICATION

This application claims priority under 35 U.S.C. § 119 to U.S. Provisional Patent Application No. 62/665,467, filed on May 1, 2018, the content of which is incorporated by reference herein in its entirety.

BACKGROUND

Natural language processing is an area of computer science and artificial intelligence concerned with the interactions between computers and human (natural) languages, in particular how to program computers to fruitfully process large amounts of natural language data.

SUMMARY

In some possible implementations, a method performed by a device may include identifying a plurality of samples of textual content; performing tokenization of the plurality of samples of textual content to generate a respective plurality of tokenized samples; performing embedding of the plurality of tokenized samples to generate a sample matrix; determining groupings of attributes of the sample matrix using a convolutional neural network; determining context relationships between the groupings of attributes using a bidirectional long short term memory (LSTM) technique; selecting predicted labels for the plurality of samples using a model, wherein the predicted labels are selected based on the context relationships, the groupings of attributes, and/or the plurality of samples, wherein the model selects, for a particular sample of the plurality of samples, a predicted label of the predicted labels from a plurality of labels based on respective scores of the particular sample with regard to the plurality of labels and based on a nonparametric paired comparison of the respective scores; and providing information identifying the predicted labels.

In some possible implementations, a device may include a memory; and one or more processors coupled to the memory, the memory and the one or more processors configured to: identify a plurality of samples of textual content; perform tokenization of the plurality of samples of textual content to generate a respective plurality of tokenized samples; perform embedding of the plurality of tokenized samples to generate a sample matrix; determine groupings of attributes of the sample matrix using a convolutional neural network; determine context relationships between the groupings of attributes using a long short term memory (LSTM) technique; select predicted labels for the plurality of samples using a model, wherein the predicted labels are selected based on the context relationships, the groupings of attributes, and/or the plurality of samples, wherein the model selects, for a particular sample of the plurality of samples, a predicted label of the predicted labels from a plurality of labels based on respective scores of the particular sample with regard to the plurality of labels and based on a nonparametric paired comparison of the respective scores; and provide information identifying the predicted labels or a result of the nonparametric paired comparison.

In some possible implementations, a non-transitory computer-readable medium storing one or more instructions that, when executed by one or more processors of a device, cause the one or more processors to: identify a plurality of samples of textual content; process the plurality of samples of textual content to generate a respective plurality of tokenized samples of numerical values corresponding to segments of the plurality of samples, wherein the processing is performed based on a based on a vocabulary set that is specific to a domain associated with the plurality of samples; determine groupings of attributes of the plurality of tokenized samples using a convolutional neural network; determine context relationships between the groupings of attributes using a bidirectional long short term memory (LSTM) technique; select predicted labels for the plurality of samples using a model, wherein the predicted labels are selected based on the context relationships, the groupings of attributes, and/or the plurality of samples, wherein the model selects, for a particular sample of the plurality of samples, a predicted label of the predicted labels from a plurality of labels based on respective scores of the particular sample with regard to the plurality of labels and based on a nonparametric paired comparison of the respective scores; and provide information identifying the predicted labels.

DETAILED DESCRIPTION

Figure 1:
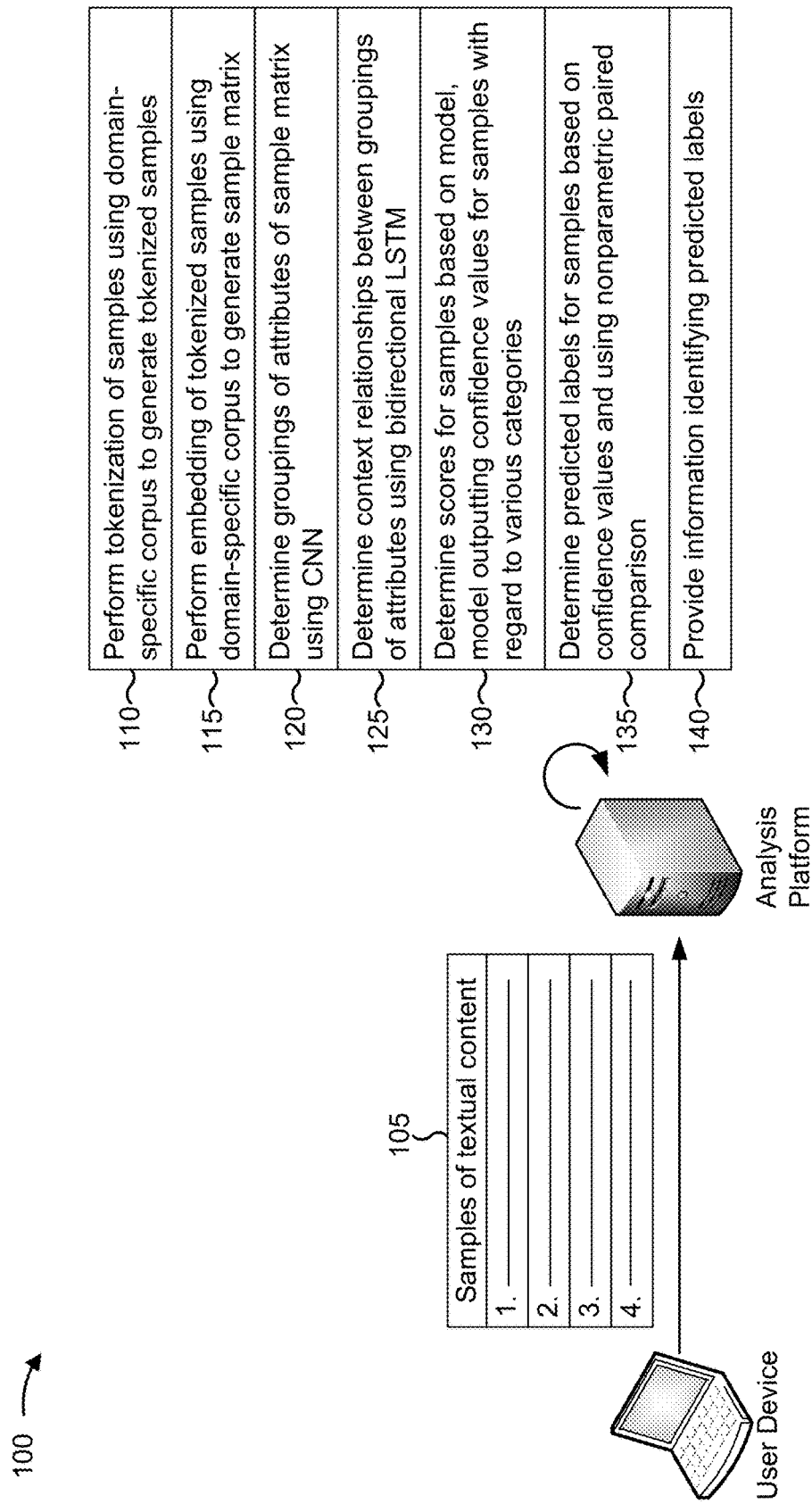
FIG. 1 is a diagram of an overview of an example implementation described herein.

The following detailed description of example implementations refers to the accompanying drawings. The same reference numbers in different drawings may identify the same or similar elements.

A device may use natural language processing to categorize text, such as human-generated text (e.g., spoken words, product reviews, mobile app reviews, service tickets, etc.). For example, the text may be categorized based on a topic of the text, content of the text, sentiment of the text, and/or any other possible categorization. However, text may be difficult to categorize due to the subjective nature of human communication. Furthermore, some types of text may be generated at a rate that makes human-implemented categorization inefficient or impossible. For example, textual samples may be provided at a rate of hundreds per day, thousands per day, and so on, which is unfeasible for human processing. Still further, some natural language processing techniques may operate without reference to an application-specific corpus of terms, which reduces accuracy of such natural language processing techniques.

Implementations described herein may perform classification of textual samples using bidirectional long short term memory (LSTM) techniques and a convolutional neural network (CNN). The bidirectional LSTM technique may use context of the textual samples to improve classification accuracy and recall relative to a system that does not use bidirectional LSTM. The CNN may group similar attributes, which improves classification accuracy and recall, and improves speed of the classification model relative to other classification models that use techniques other than CNNs. Some implementations described herein may perform the classification based on a nonparametric paired comparison of scores for the textual samples, such as a Wilcoxon Signed Rank test. The nonparametric paired comparison may increase a success rate of classification and may reduce uncertainty with regard to the classifications, thereby enabling a higher success rate in comparison to other classification techniques, such as those using a single threshold to determine whether classification is successful. Furthermore, some implementations described herein may use a domain-specific corpus to perform classification, thereby improving success rates in comparison to techniques that do not use a domain-specific corpus. Still further, some implementations described herein may automate a process of categorizing textual samples, that was previously achieved by a human actor manually and subjectively reading the textual sample and determining a categorization, using a rigorous and technical approach (e.g., bidirectional LSTM, convolutional neural networking, and a nonparametric paired comparison) that was not previously performed by a human actor.

While implementations described herein are primarily described in the context of classification of text samples, implementations described herein are not so limited. For example, implementations described herein may be used to perform classification of other forms of data other than text samples, such as image samples, multimedia samples, and/or the like.

FIG. 1 is a diagram of an overview of an example implementation 100 described herein. The operations described in connection with example implementation 100 may be performed by an analysis platform (e.g., analysis platform 230) or another device described in connection with FIG. 2, below.

As shown in FIG. 1, and by reference number 105, an analysis platform may receive samples of textual content. The analysis platform may receive the samples for classification of the samples with regard to one or more values (e.g., label, service, features, sentiment, or any other value). In some implementations, and as shown, the analysis platform may receive the samples of textual content from one or more user devices. For example, the user devices may provide textual samples that are received or generated by the user devices. In some implementations, the analysis platform may receive the samples of textual content from a server device. For example, the server device may store the samples of textual content, and may provide the samples of textual content to the analysis platform for classification. The samples may be provided as a batch, individually, as a stream, and/or the like. In some implementations, the analysis platform may receive the samples from multiple, different sources (e.g., web servers, user devices, server devices, a customer server, etc.). In some implementations, the samples may be provided in any file type or format.

In some implementations, a sample of textual content may include a string of natural language. For example, the sample of textual content may include a string that is generated by a user, such as an online review, a voicemail, an email, a text message, transcribed speech, and/or the like. A sample may include one or more words, one or more phrases, one or more sentences, and/or the like. In some implementations, multiple samples may be related to each other. For example, a first sample may be an input to a first field and a second sample may be an input to a second field. As another example, a first sentence of a review may be a first sample and a second sentence of a review may be a second sample.

As shown by reference number 110, the analysis platform may perform tokenization of the samples using a domain-specific corpus to generate tokenized samples. Tokenization may include processing of the samples to convert the samples from a textual form (e.g., a plaintext data format) to a numerical sequence (e.g., a tokenized sample, a vector, etc.). In some implementations, the textual samples may be padded after tokenization. In some implementations, a data structure may be generated using the tokenized samples (e.g., a columnar data structure, a binary dataframe, etc.). In some implementations, the analysis platform may perform tokenization using a text processing tokenizer (e.g., Keras, or a similar tokenizer). In some implementations, the analysis platform may generate a tokenized sample for each textual sample. For example, there may be a one-to-one mapping of tokenized samples to input samples.

In some implementations, the analysis platform may perform tokenization of the samples using a domain-specific corpus. The domain-specific corpus may identify mappings of terms (e.g., words, phrases, letters, numbers, etc.) from samples to tokens (e.g., numerical sequences). In some implementations, the domain-specific corpus may include terms relevant to a domain associated with the samples. For example, when the samples include reviews for a particular set of products, the domain-specific corpus may include terms relevant to reviews, the particular set of products, sentiments of the reviews, company-specific terms or jargon, and/or the like. Using the domain-specific corpus may improve accuracy of classification of the data, thereby reducing human interaction for inaccurately classified samples. In some implementations, the analysis platform may perform tokenization using a non-domain-specific corpus, such as a published corpus, which may conserve time and processor resources associated with configuring the domain-specific corpus.

As shown by reference number 115, the analysis platform may perform embedding of the tokenized samples using the domain-specific corpus to generate a sample matrix. Embedding may generate a sample matrix based on the tokenized samples (e.g., vectors of the tokenized samples), which may conserve storage space and save processing resources by streamlining processing of the tokenized samples while preserving relations between words or terms of the tokenized samples. In some implementations, the sample matrix may be referred to as a word embedding. In some implementations, the analysis platform may use an embedding tool to perform embedding, such as Keras or a similar tool.

In some implementations, the analysis platform may perform the embedding based on the domain-specific corpus, described above. This may improve accuracy of the model with regard to classification of the samples. For example, assume that a first product and a second product are related to each other and have different names. A generic corpus may not indicate that the different names are related to each other, so classification of samples including the different names may not accurately reflect that the samples may be related based on including the different names. The domain-specific corpus may indicate that the different names are related to each other, and thus may improve accuracy of classification of samples including the different names.

As shown by reference number 120, the analysis platform may determine groupings of attributes of the sample matrix using a convolutional neural network (CNN). A CNN is a deep, feed-forward artificial neural network composed of neurons that have learnable weights and biases. One advantage of using a CNN for classification of samples is that a CNN uses relatively little pre-processing relative to other classification algorithms, which conserves processing resources that would be used to perform additional pre-processing for another type of classification algorithm. In some implementations, the CNN may examine local relationships between sequences via a sliding window across each tokenized sample (e.g., each entry of the sample matrix), which may help with grouping similar attributes together. An example of this is breaking down the following sentence: "The messaging app has not been working", to be represented as "the messaging app," "messaging app has," "app has not," "has not been," and "not been working." These smaller phrase vectors may then be inner mapped on relations and similarities, breaking down the large phrase into smaller, connected parts (e.g., "the messaging app" and "not been working"). In addition to increasing accuracy and reducing the dimensionality of information passed to the bidirectional LSTM layer (thereby conserving processor resources), the CNN layer may improve processing speed of the training model in comparison to other classification models.

In some implementations, the analysis platform may use a recurrent neural network to process the tokenized samples. A recurrent neural network may form a directed graph along a sequence based on connections between units. This may be useful because a recurrent neural network may use an internal state to process sequences of inputs (e.g., values of tokenized samples), which improves accuracy of sample classification in relation to other forms of neural networks due to the sequential nature of the textual samples.

As shown by reference number 125, the analysis platform may determine context relationships between groupings of attributes using a recurrent neural network, such as a bidirectional long short-term memory (LSTM) network. A context relationship, as described herein, may refer to a relationship between two or more attributes of a sample or a set of samples. For example, assume that a sample includes: "Log-in was great and easy to use. However, I wish the process had fewer steps." The analysis platform (e.g., using the recurrent neural network, may identify a context relationship between "the process" and "Log-in." This context relationship may serve as an input for a model to determine a predicted label for a sample, as described in more detail below. These context relationships may be identified within a sample (e.g., a long term dependency within a sample) or between two or more different samples.

A bidirectional recurrent neural network (e.g., a bidirectional LSTM) may operate in a forward or positive direction and in a backward or negative direction. In this way, a bidirectional recurrent neural network may determine relations in a forward-looking fashion (e.g., from one word of a sample forward to a later word of the sample) and in a backward-looking fashion (from a later word back to an earlier word). In other words, a bidirectional recurrent network may run in a forward direction and a backward direction. This improves classification accuracy in relation to using a unidirectional recurrent neural network. Conversely, using a unidirectional recurrent neural network may conserve processor resources in relation to a bidirectional recurrent neural network.

An LSTM network may be particularly useful for sequence classification problems, such as the classification of the textual samples described herein. In some implementations, an LSTM network may be a neural network that uses LSTM units (e.g., with a cell, an input gate, an output gate, and a forget gate) for neurons. The LSTM network may retain a short-term memory of the neural network for a longer period of time than other neural networks, thus enabling more accurate processing of sequential inputs (e.g., textual samples) in comparison to a neural network that does not retain short-term memory for the longer time period.

As shown by reference number 130, the analysis platform may determine scores for samples based on a model. The model may output scores for samples with regard to various labels. The model may apply weights with regard to input information (e.g., the sample matrix, before or after processing using the CNN and the bidirectional LSTM, sentiment values for terms of the sample matrix, etc.), and may output one or more labels with one or more corresponding scores. In some implementations, the model may include the CNN and/or the bidirectional LSTM. In some implementations, the model may be separate from the CNN and/or the bidirectional LSTM. In some implementations, the model may determine a score for one or more labels. For example, the model may determine the score based on a confidence level, outputted by the model, for the one or more labels assigned to a sample. Additionally, or alternatively, the score may be the confidence level. In some implementations, the score may be a softmax value.

In some implementations, the label may relate to a label or classification for a sample. For example, the label may have one of a plurality of values, selected from different classifications associated with the label. As particular examples, when the textual sample is a product review, the label may relate to a sentiment of a textual sample, a tag associated with the textual sample, a product associated with the textual sample, a service associated with the textual sample, an issue associated with a textual sample, and/or the like. Of course, the implementations described herein are not limited to product reviews and may be applied for any sort of textual sample.

In some implementations, the model may determine a score or label based on a Monte Carlo simulation. A Monte Carlo simulation may use repeated sampling (e.g., random or pseudorandom sampling) to obtain numerical results (e.g., the labels and/or scores). For example, the analysis platform may input a sample to the model multiple times while varying one or more parameters. The model may output multiple labels for the sample, and the analysis platform may determine a score for the sample based on the multiple labels. This may create the plurality of labels for the samples that are described elsewhere herein.

In some implementations, the model may perform the Monte Carlo simulation based on a dropout technique. In some implementations, a Monte Carlo dropout technique may be similar to a T forward stochastic process, a model averaging process, and/or the like. For example, the model may thin one or more layers of the CNN or the bidirectional LSTM by deactivating one or more nodes (e.g., neurons) of the one or more layers. The model may iteratively determine labels for a sample while deactivating different nodes of the CNN or the bidirectional LSTM. For example, the model may run each prediction multiple, different times using different dropout configurations (e.g., different combinations of deactivated nodes). By performing dropout at the modeling phase, robustness and accuracy of the classification model are improved and Monte Carlo simulation is enabled. For example, an entropy or variation of a highest output (e.g., an output or label associated with a best score) to determine an uncertainty of the model prediction, which improves accuracy of the model, increases information available regarding model computation, and contributes to the usage of a nonparametric paired comparison to determine predicted labels.

In some implementations, the analysis platform may train the model. For example, the analysis platform may train the model using a machine learning algorithm, an artificial learning algorithm, and/or the like. Training may refer to an initial training stage (e.g., training the model for the first time) or updating the model (e.g., after the model is implemented, using another training set of data, etc.). In some implementations, the analysis platform may train the model based on a set of samples and known labels or scores associated with the set of samples. For example, the analysis platform may adjust weights associated with the nodes of the CNN and/or the bidirectional recurrent neural network based on whether an output of the CNN and/or the bidirectional recurrent neural network is accurate with regard to the known labels or scores. In some implementations, the analysis platform may train the model based on feedback. For example, the feedback may indicate whether the label or score, assigned to a sample, is accurate. In some implementations, the analysis platform may train the model based on a dropout approach similar to the one described above, which improves robustness of the model and reduces likelihood of local minima or maxima skewing outputs of the model.

As shown by reference number 135, the analysis platform may determine predicted labels for the samples based on the scores and using a nonparametric paired comparison. For example, a sample may be associated with multiple, different labels, and each label may be associated with one or more scores. The score may indicate a confidence level of the model with regard to the label. The analysis platform may use a nonparametric paired comparison to determine that a particular label is significant in comparison to other labels associated with a sample and/or in comparison to highest-scoring labels (or all labels) for other samples. Using a nonparametric paired comparison may provide an increased number of successful classifications in comparison to some other approaches, such as a threshold-based approach wherein any classification with a confidence level over a particular threshold is accepted, and may provide increased accuracy in situations where two or more labels are associated with a score that satisfies a threshold.

In some implementations, the nonparametric paired comparison may be based on a Wilcoxon signed rank test. For example, the analytics platform may identify a baseline label based on the baseline label having a highest median score (e.g., a highest median softmax output) of a set of labels. For a model with label options K, the analytics platform may run K−1 Wilcoxon signed rank tests, comparing the baseline label against the other label options. The Wilcoxon Signed Rank test is a nonparametric paired comparison testing for a difference between two samples. Each individual label may be compared at an alpha value (e.g., 0.01, 0.05, etc.) divided by a Bonferroni adjustment for the number of comparisons being made (e.g., K−1). If all K−1 comparisons (comparing the baseline output to all the other outputs) result in p-values less than 0.05/(K−1), the analytics platform may determine that the baseline output is significantly larger than all the other outputs, and may therefore select the corresponding label as a predicted label. If at least one p-value is greater than the adjusted alpha, the review classification result may be considered insignificant. In such a case, the classification result may be provided to a user for labeling, may be dropped, and/or the like, as described in more detail below. In this way, the analytics platform uses a nonparametric paired comparison to determine that a particular label is significant in comparison to other labels associated with a sample, which may provide more consistent classification and fewer unclassified samples than a threshold-based method for determining predicted labels. Furthermore, the nonparametric paired comparison may be more effective with lower-performing models than a single-threshold-based determination (such as a softmax threshold determination), may provide improved performance for a large number of potential labels in comparison to the single-threshold-based determination, and may provide more information regarding confidence or certainty of the model.

As shown by reference number 140, the analysis platform may selectively provide information identifying the predicted labels. In some implementations, the analysis platform may provide information identifying the predicted labels for particular samples. For example, the analysis platform may provide information identifying predicted labels that are determined to be significant using the nonparametric paired comparison test described above. In some implementations, the analysis platform may provide information identifying a best label, may provide information identifying multiple, different labels, and/or the like. In some implementations, the analysis platform may provide the information identifying the predicted labels for storage, for display to a user, for publication to a webpage, and/or the like.

In some implementations, the analysis platform may provide a particular sample and/or information associated with the particular sample for a user. For example, when the analysis platform determines that a particular sample is not associated with a significant label using the nonparametric paired comparison test described above, the analysis platform may provide the particular sample for classification by a user. For example, the analysis platform may provide identifying a suggested label, multiple suggested labels, scores associated with a suggested label or multiple suggested labels, and/or the like. In some implementations, the analysis platform may receive feedback regarding the particular sample. For example, the feedback may indicate a selected label for the particular sample. In this case, the analysis platform may update the model based on the selected label, as described in more detail elsewhere herein.

In some implementations, the analysis platform may receive feedback regarding a sample. For example, the analysis platform may receive information indicating whether a predicted label associated with a sample is accurate. As another example, the analysis platform may receive information identifying a label for a sample (e.g., a label for a sample for which no significant classification was identified, etc.). In some implementations, the analysis platform may train or update the model based on the feedback. For example, the analysis platform may use a machine learning algorithm, an artificial intelligence algorithm, and/or the like, to train or update the model. In this way, the analysis platform may update the model based on feedback regarding predicted labels (when a significant label is identified for a sample) and based on feedback regarding samples (when no significant label is identified for a sample). This may improve accuracy of the model, thereby reducing the number of samples that require user intervention and reducing time associated with classifying samples.

In this way, the analysis platform increases a success rate of classification and may reduce uncertainty with regard to the classifications, thereby enabling a higher success rate in comparison to other classification techniques, such as those using parametric comparisons or single-threshold-based comparisons to determine whether classification is successful. Furthermore, the analysis platform may use a domain-specific corpus to perform classification, thereby improving success rates in comparison to techniques that do not use a domain-specific corpus. Still further, the analysis platform may automate a process of categorizing textual samples, that was previously achieved by a human actor manually and subjectively reading the textual sample and determining a categorization, using a rigorous and technical approach (e.g., bidirectional LSTM, convolutional neural networking, and a nonparametric paired comparison) that was not previously performed by a human actor.

As indicated above, FIG. 1 is provided merely as an example. Other examples are possible and may differ from what was described with regard to FIG. 1.

Figure 2:
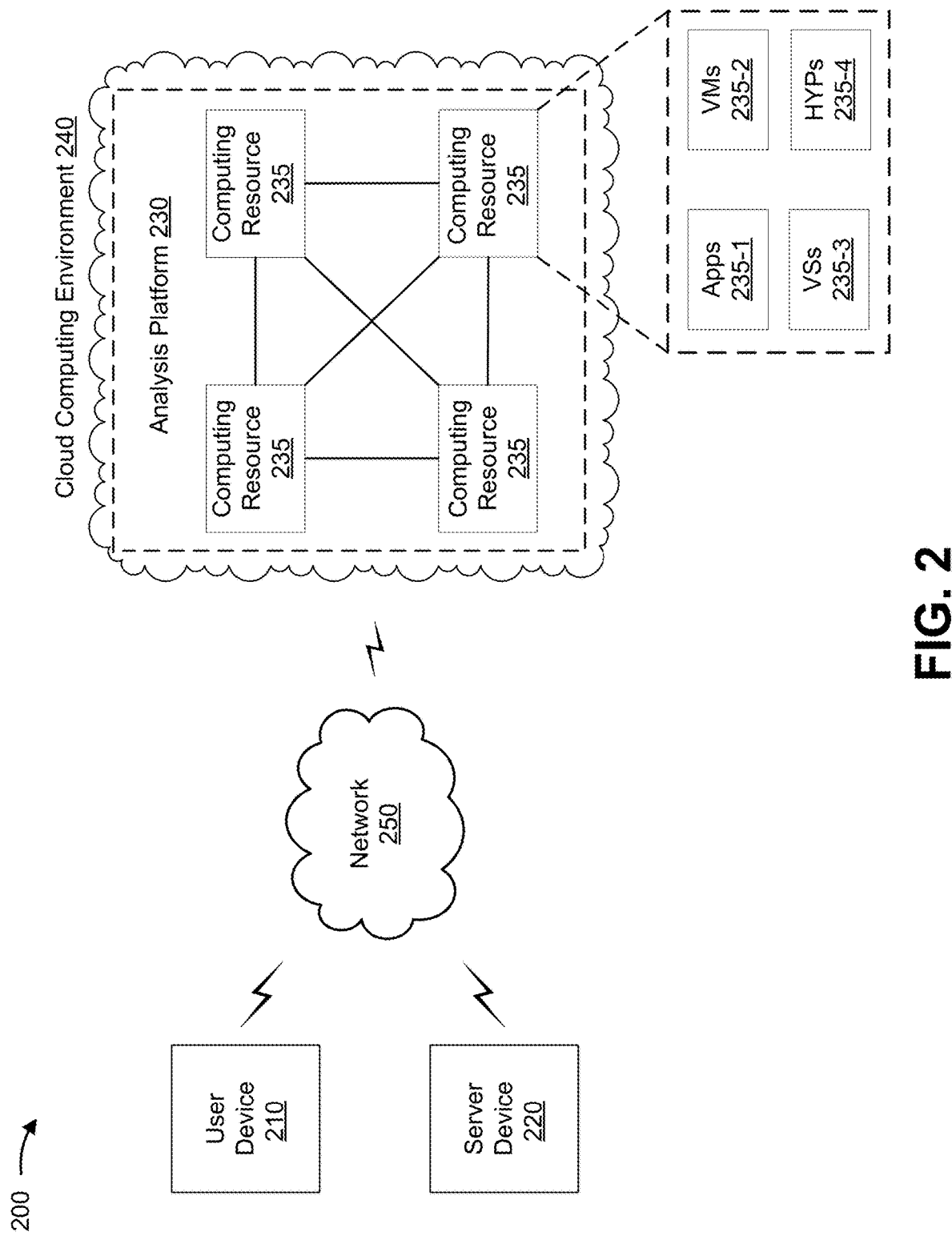
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210, a server device 220, an analysis platform 230, computing resource 235, a cloud computing environment 240, and a network 250. Devices of environment 200 may interconnect via wired connections, wireless connections, or a combination of wired and wireless connections.

User device 210 includes one or more devices capable of receiving, generating, storing, processing, and/or providing information associated with samples to be classified. For example, user device 210 may include a communication and/or computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device.

Server device 220 includes one or more devices capable of storing, processing, and/or routing information associated with textual samples. For example, server device 220 may include a server or a group of servers. In some implementations, server device 220 may be implemented using cloud computing environment 240.

Analysis platform 230 includes one or more devices capable of receiving, generating, storing, processing, and providing information for natural language processing of textual samples. For example, analysis platform 230 may include a server, a group of servers, a user device, and/or the like. In some implementations, analysis platform 230 may be implemented using cloud computing environment 240.

Cloud computing environment 240 includes an environment that delivers computing as a service, whereby shared resources, services, etc. may be provided to server device 220 and/or analysis platform 230. Cloud computing environment 240 may provide computation, software, data access, storage, and/or other services that do not require end-user knowledge of a physical location and configuration of a system and/or a device that delivers the services. As shown, cloud computing environment 240 may include analysis platform 230 and computing resource 235.

Computing resource 235 includes one or more personal computers, workstation computers, server devices, or another type of computation and/or communication device. In some implementations, computing resource 235 may host analysis platform 230. The cloud resources may include compute instances executing in computing resource 235, storage devices provided in computing resource 235, data transfer devices provided by computing resource 235, etc. In some implementations, computing resource 235 may communicate with other computing resources 235 via wired connections, wireless connections, or a combination of wired and wireless connections.

As further shown in FIG. 2, computing resource 235 may include a group of cloud resources, such as one or more applications ("APPs") 235-1, one or more virtual machines ("VMs") 235-2, virtualized storage ("VSs") 235-3, one or more hypervisors ("HYPs") 235-4, or the like.

Application 235-1 includes one or more software applications that may be provided to or accessed by user device 210. Application 235-1 may eliminate a need to install and execute the software applications on user device 210. For example, application 235-1 may include software associated with analysis platform 230 and/or any other software capable of being provided via cloud computing environment 240. In some implementations, one application 235-1 may send/receive information to/from one or more other applications 235-1, via virtual machine 235-2.

Virtual machine 235-2 includes a software implementation of a machine (e.g., a computer) that executes programs like a physical machine. Virtual machine 235-2 may be either a system virtual machine or a process virtual machine, depending upon use and degree of correspondence to any real machine by virtual machine 235-2. A system virtual machine may provide a complete system platform that supports execution of a complete operating system ("OS"). A process virtual machine may execute a single program, and may support a single process. In some implementations, virtual machine 235-2 may execute on behalf of a user (e.g., user device 210), and may manage infrastructure of cloud computing environment 240, such as data management, synchronization, or long-duration data transfers.

Virtualized storage 235-3 includes one or more storage systems and/or one or more devices that use virtualization techniques within the storage systems or devices of computing resource 235. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 235-4 provides hardware virtualization techniques that allow multiple operating systems (e.g., "guest operating systems") to execute concurrently on a host computer, such as computing resource 235. Hypervisor 235-4 may present a virtual operating platform to the guest operating systems, and may manage the execution of the guest operating systems. Multiple instances of a variety of operating systems may share virtualized hardware resources.

Network 250 includes one or more wired and/or wireless networks. For example, network 250 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
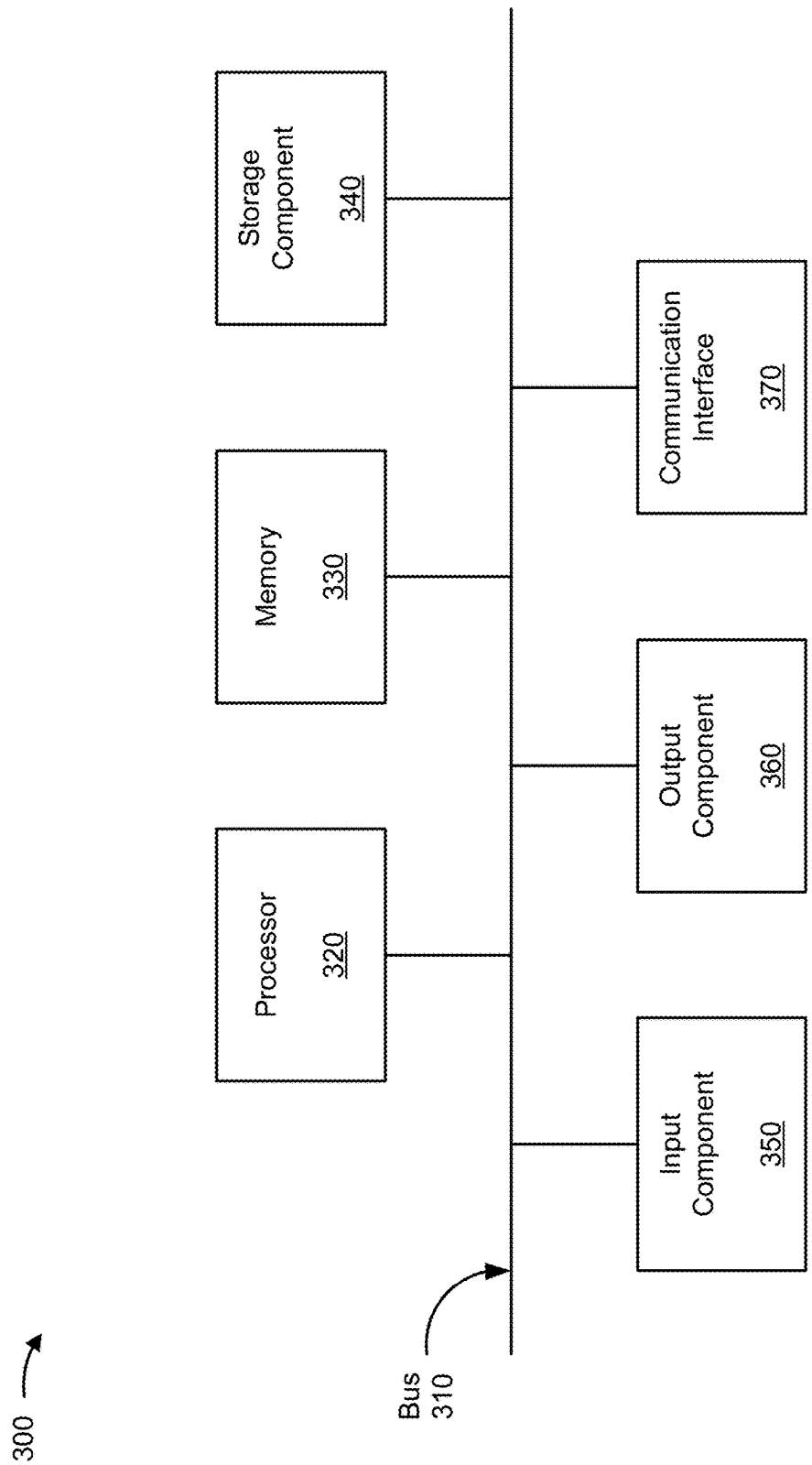
FIG. 3 is a diagram of example components of one or more devices of FIG. 2.

FIG. 3 is a diagram of example components of a device 300. Device 300 may correspond to user device 210, server device 220, analysis platform 230, and/or computing resource 235. In some implementations, user device 210, a server device 220, an analysis platform 230, and/or a computing resource 235 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
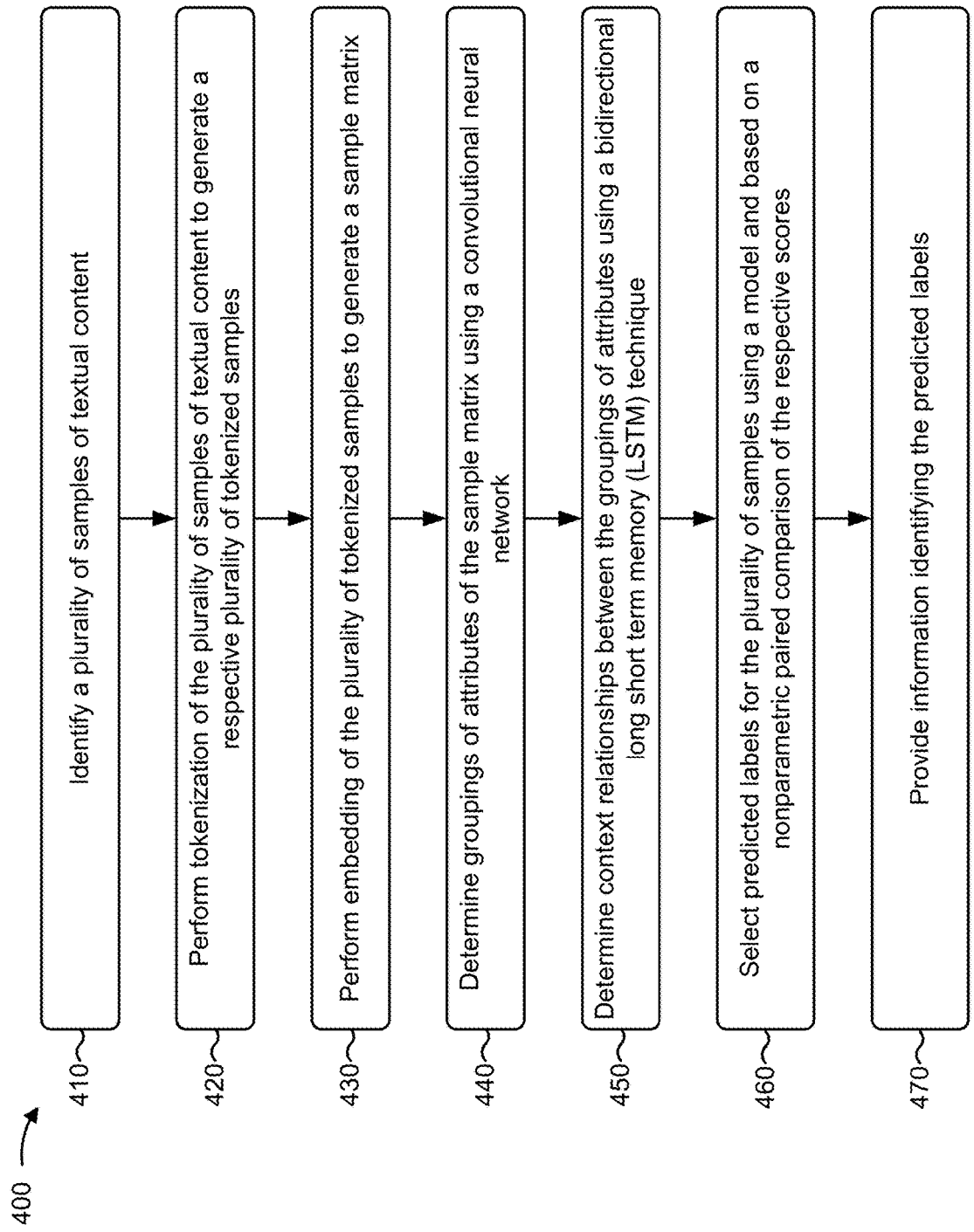
FIG. 4 is a flow chart of an example process for performing text categorization using bi-directional long short-term memory and convolutional neural networking.

FIG. 4 is a flow chart of an example process 400 for performing text categorization using bi-directional long short-term memory and convolutional neural networking. In some implementations, one or more process blocks of FIG. 4 may be performed by an analysis platform (e.g., analysis platform 230). In some implementations, one or more process blocks of FIG. 4 may be performed by another device or a group of devices separate from or including the analysis platform, such as a user device (e.g., user device 210), a server device (e.g., server device 220), and/or a computing resource (e.g., computing resource 235).

As shown in FIG. 4, process 400 may include identifying a plurality of samples of textual content (block 410). For example, the analysis platform (e.g., using processor 320, communication interface 370, and/or the like) may identify a plurality of samples of textual content. In some implementations, the plurality of samples may include user-generated samples, such as user-generated reviews and/or the like. In some implementations, the plurality of samples may be received from a storage device (e.g., server device 220), a user device (e.g., user device 210), and/or the like.

As further shown in FIG. 4, process 400 may include performing tokenization of the plurality of samples of textual content to generate a plurality of tokenized samples (block 420). For example, the analysis platform (e.g., using processor 320 and/or the like) may perform tokenization to generate numerical representations of the plurality of samples. The numerical representations may be referred to as tokenized samples. In some implementations, the analysis platform may generate the tokenized samples using a domain-specific corpus of terms.

As further shown in FIG. 4, process 400 may include performing embedding of the plurality of tokenized samples to generate a sample matrix (block 430). For example, the analysis platform (e.g., using processor 320 and/or the like) may perform embedding of the plurality of tokenized samples. In some implementations, the analysis platform may generate a sample matrix using the plurality of tokenized samples by performing embedding for the plurality of tokenized samples. The sample matrix may provide more efficient processing and storage than some forms of storage, such as non-dense representations of the plurality of tokenized samples.

As further shown in FIG. 4, process 400 may include determining groupings of attributes of the sample matrix using a convolutional neural network (block 440). For example, the analysis platform (e.g., using processor 320 and/or the like) may determine groupings of attributes of the sample matrix. In some implementations, the analysis platform may determine the groupings using a CNN or another type of neural network. For example, the CNN or other type of neural network may be trained by the analysis platform or by another device. In some implementations, the CNN may be part of the model described elsewhere herein.

As further shown in FIG. 4, process 400 may include determining context relationships between the groupings of attributes using a bidirectional long short term memory (LSTM) technique (block 450). For example, the analysis platform (e.g., using processor 320 and/or the like) may determine context relationships between the groupings of attributes. In some implementations, the bidirectional LSTM technique may determine context relationships between the groupings in a forward direction and a reverse direction, which may provide improved accuracy in comparison to determining the context relationships in a single direction. In some implementations, the analysis platform may use the groupings and/or the context relationships to determine sentiments and/or labels associated with the reviews, as described in more detail elsewhere herein. In some implementations, the bidirectional LSTM technique may be part of the model described elsewhere herein.

As further shown in FIG. 4, process 400 may include selecting predicted labels for the plurality of samples using a model and based on a nonparametric paired comparison of the respective scores (block 460). For example, the analysis platform (e.g., using processor 320 and/or the like) may select predicted labels for the plurality of samples based on a nonparametric paired comparison test. The analysis platform may select the predicted labels using a model. As described herein, the model may include the embedding layer, the CNN, the bidirectional LSTM, a machine learning model trained to classify samples based on outputs of the embedding layer, the CNN, and/or the bidirectional LSTM, or a combination of the above. In some implementations, the analysis platform may determine that a predicted label is not to be selected for a particular sample based on the nonparametric paired comparison test (e.g., based on no label being determined as significant for the particular sample.

As further shown in FIG. 4, process 400 may include providing information identifying the predicted labels (block 470). For example, the analysis platform (e.g., using processor 320, communication interface 370, and/or the like) may provide information identifying the predicted labels. In some implementations, the analysis platform may provide information identifying the plurality of samples associated with the predicted labels. In some implementations, the analysis platform may provide information identifying a sample as associated with a non-significant label.

The analysis platform may provide the information identifying the plurality of samples for storage, for provision to a user, and/or the like.

Process 400 may include additional implementations, such as any single implementation or any combination of implementations described below.

In some implementations, the analysis platform may determine the respective scores for the predicted labels based on a Monte Carlo simulation using a dropout technique. In some implementations, the nonparametric paired comparison is based on a Wilcoxon Signed Rank test. In some implementations, the analysis platform may perform the tokenization of the plurality of samples based on a vocabulary set that is specific to a domain associated with the plurality of samples. In some implementations, the analysis platform may train the model based on a training set of samples and corresponding labels. In some implementations, the model is trained using a dropout technique.

In some implementations, the convolutional neural network is a 1-dimensional convolutional neural network. In some implementations, the analysis platform may obtain the plurality of textual samples from a website or web interface. In some implementations, the LSTM technique is a bidirectional LSTM technique. In some implementations, the analysis platform may receive information indicating whether the predicted labels are correct; and update the model based on the information indicating whether the predicted labels are correct.

In some implementations, the respective scores for the predicted labels are determined based on a Monte Carlo simulation using a dropout technique. In some implementations, the analysis platform may train the model to determine the respective scores, wherein the model is trained using a dropout technique. In some implementations, the analysis platform may determine respective confidence values associated with the predicted labels based on the model and the nonparametric paired comparison; and provide information indicating whether the predicted labels are associated with a threshold confidence level based on the respective confidence values and the nonparametric paired comparison.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
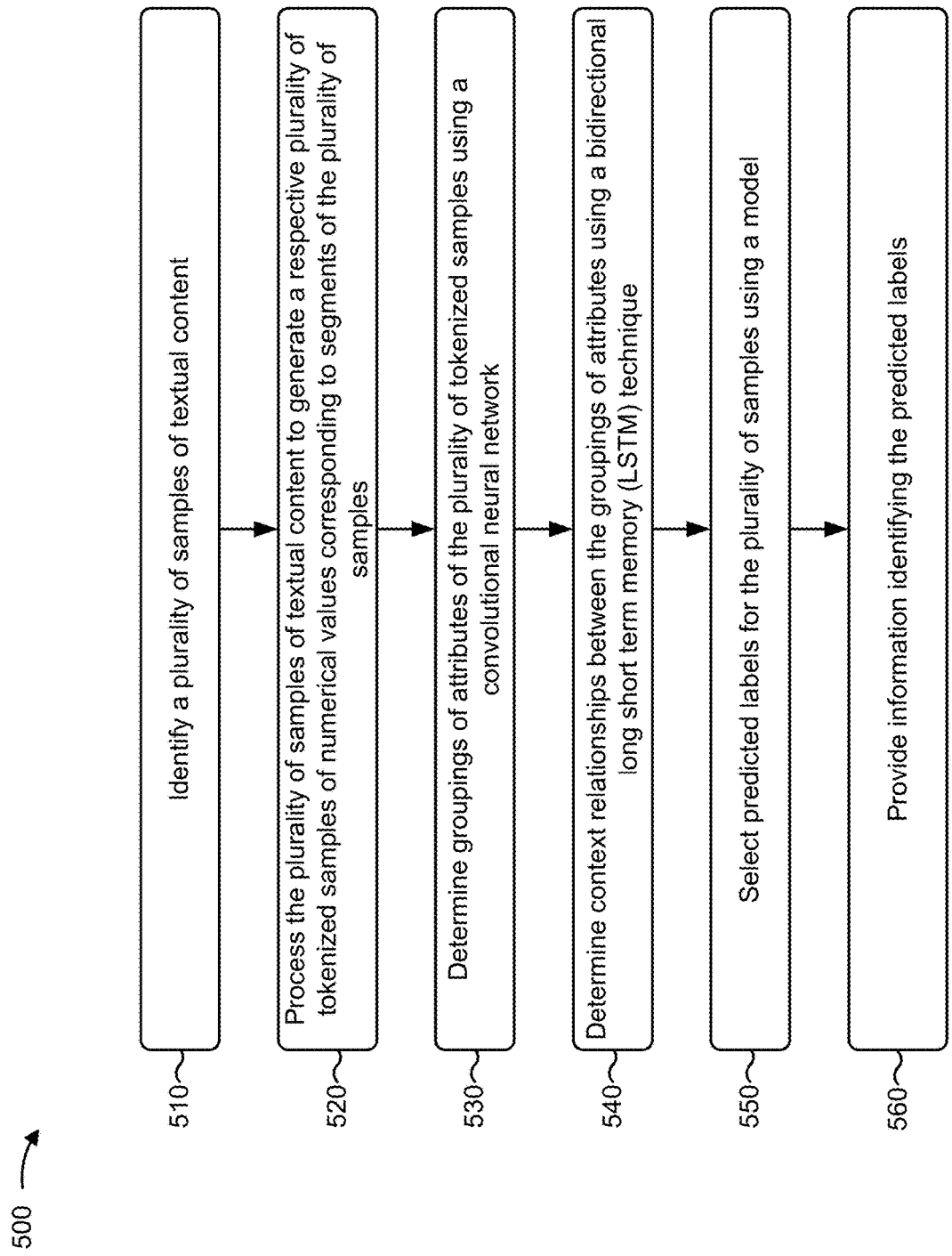
FIG. 5 is a flow chart of another example process for performing text categorization using bi-directional long short-term memory and convolutional neural networking.

FIG. 5 is a flow chart of an example process 500 for performing text categorization using bi-directional long short-term memory and convolutional neural networking. In some implementations, one or more process blocks of FIG. 5 may be performed by an analysis platform (e.g., analysis platform 230). In some implementations, one or more process blocks of FIG. 5 may be performed by another device or a group of devices separate from or including the analysis platform, such as a user device (e.g., user device 210), a server device (e.g., server device 220), and/or a computing resource (e.g., computing resource 235).

As shown in FIG. 5, process 500 may include identifying a plurality of samples of textual content (block 510). For example, the analysis platform (e.g., using processor 320, communication interface 370, and/or the like) may identify a plurality of samples of textual content. In some implementations, the plurality of samples may include user-generated samples, such as user-generated reviews and/or the like. In some implementations, the plurality of samples may be received from a storage device (e.g., server device 220), a user device (e.g., user device 210), and/or the like.

As further shown in FIG. 5, process 500 may include processing the plurality of samples of textual context to generate a respective plurality of tokenized samples of numerical values corresponding to segments of the plurality of samples (block 520). For example, the analysis platform (e.g., using processor 320 and/or the like) may process the plurality of samples to generate numerical representations of the plurality of samples. The numerical representations may be referred to as tokenized samples. In some implementations, the analysis platform may generate the tokenized samples using a domain-specific corpus of terms. In some implementations, the analysis platform may generate one tokenized sample (e.g., one sample of numerical values) for each sample of textual content. For example, there may be a one-to-one mapping of samples to tokenized samples.

As further shown in FIG. 5, process 500 may include determining groupings of attributes of the plurality of tokenized samples using a convolutional neural network (block 530). For example, the analysis platform (e.g., using processor 320 and/or the like) may determine groupings of attributes of the tokenized samples. In some implementations, the analysis platform may determine the groupings using a CNN or another type of neural network. For example, the CNN or other type of neural network may be trained by the analysis platform or by another device. In some implementations, the CNN may be part of the model described elsewhere herein.

As further shown in FIG. 5, process 500 may include determining context relationships between the groupings of attributes using a bidirectional long short term memory technique (block 540). For example, the analysis platform (e.g., using processor 320 and/or the like) may determine context relationships between the groupings of attributes. In some implementations, the bidirectional LSTM technique may determine context relationships between the groupings in a forward direction and a reverse direction, which may provide improved accuracy in comparison to determining the context relationships in a single direction. In some implementations, the analysis platform may use the groupings and/or the context relationships to determine sentiments and/or labels associated with the reviews, as described in more detail elsewhere herein. In some implementations, the bidirectional LSTM technique may be part of the model described elsewhere herein.

As further shown in FIG. 5, process 500 may include selecting predicted labels for the plurality of samples using a model (block 550). For example, the analysis platform (e.g., using processor 320 and/or the like) may select predicted labels for the plurality of samples based on a nonparametric paired comparison test. The analysis platform may select the predicted labels using a model. As described herein, the model may include the embedding layer, the CNN, the bidirectional LSTM, a machine learning model trained to classify samples based on outputs of the embedding layer, the CNN, and/or the bidirectional LSTM, or a combination of the above. In some implementations, the analysis platform may determine that a predicted label is not to be selected for a particular sample based on the nonparametric paired comparison test (e.g., based on no label being determined as significant for the particular sample.

As further shown in FIG. 5, process 500 may include providing information identifying the predicted labels (block 560). For example, the analysis platform (e.g., using processor 320, communication interface 370, and/or the like) may provide information identifying the predicted labels. In some implementations, the analysis platform may provide information identifying the plurality of samples associated with the predicted labels. In some implementations, the analysis platform may provide information identifying a sample as associated with a non-significant label. The analysis platform may provide the information identifying the plurality of samples for storage, for provision to a user, and/or the like.

Process 500 may include additional implementations, such as any single implementation or any combination of implementations described below.

In some implementations, the analysis platform may determine the respective scores based on a Monte Carlo simulation using a dropout technique. In some implementations, the nonparametric paired comparison comprises a Wilcoxon Signed Rank test. In some implementations, the respective scores are outputs of a softmax function of the model. In some implementations, the analysis platform 230 may select the predicted labels based on confidence levels associated with the predicted labels. In some implementations, the confidence levels are determined based on the nonparametric paired comparison.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

In this way, analysis platform 230 improves accuracy and efficiency of textual sample labelling in comparison to manual methods and in comparison to some computer-implemented methods by using a combination of word embedding, a CNN, and/or a bidirectional LSTM. Furthermore, analysis platform 230 conserves storage resources by generating a sample matrix using the word embedding layer. Still further, analysis platform 230 improves efficiency of processing the plurality of textual samples by performing tokenization using a domain-specific corpus in comparison to using a generic corpus that does not take into account jargon, product names, and/or the like. Thus, volumes of sample labeling are enabled (e.g., thousands of samples per day, millions of samples per day, etc.) that would be impossible to provide using manual means.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method performed by a device, comprising:
    identifying a plurality of samples of textual content,
        the plurality of samples of textual context including user-generated reviews of products;
    performing tokenization of the plurality of samples of textual content to generate a respective plurality of tokenized samples using a domain-specific corpus,
        the domain-specific corpus being based on a vocabulary set that is specific to a domain associated with the plurality of samples,
        the vocabulary set including company-specific terms or jargon,
        the domain-specific corpus including information indicating relatedness of a first product and a second product,
        the first product and second product having different names,
        the tokenization including converting the plurality of samples to a numerical sequence associated with the respective plurality of tokenized samples, and
        the domain-specific corpus to identify a mapping of one or more terms from the plurality of samples to the respective plurality of tokenized samples;
    performing embedding of the respective plurality of tokenized samples using the domain-specific corpus to generate a sample matrix;
    determining groupings of attributes of the sample matrix using a convolutional neural network,
        the groupings of attributes of the sample matrix being passed to a bidirectional long short-term memory (LSTM) layer;
    determining context relationships between the groupings of attributes using a bidirectional LSTM technique associated with the bidirectional LSTM layer;
    selecting a predicted label of a plurality of predicted labels for the plurality of samples using a model,
        wherein the predicted label is selected based on the context relationships, the groupings of attributes, and/or the plurality of samples,
        wherein the model selects, for a particular sample of the plurality of samples, one of the plurality of predicted labels based on respective scores of the particular sample with regard to the plurality of predicted labels and based on a nonparametric paired comparison of the respective scores;
    determining the respective scores for the predicted label based on a Monte Carlo simulation using a dropout technique;
    providing information identifying the predicted label to a user for classification;
    receiving feedback associated with the particular sample from the user,
        the feedback including one or more of:
            information indicating whether the predicted label associated with the particular sample is correct, or
            information indicating a selected label when no significant label is identified for the particular sample; and
    updating the model based on the feedback from the user.

2. The method of claim 1, wherein the nonparametric paired comparison is based on a Wilcoxon Signed Rank test.

3. The method of claim 1, further comprising:
    training the model based on a training set of samples and corresponding labels.

4. The method of claim 3, wherein the model is trained using a dropout technique.

5. The method of claim 1, wherein the convolutional neural network is a 1-dimensional convolutional neural network.

6. The method of claim 1, wherein the model is trained using machine learning or artificial intelligence.

7. The method of claim 1, wherein the no significant label is identified for the particular sample based on the particular sample failing to meet a threshold value.

8. A device, comprising:
    a memory; and
    one or more processors coupled to the memory, the memory and the one or more processors configured to:
        identify a plurality of samples of textual content,
            the plurality of samples of textual context including user-generated reviews of products;
        perform tokenization of the plurality of samples of textual content to generate a respective plurality of tokenized samples using a domain-specific corpus,
            the domain-specific corpus being based on a vocabulary set that is specific to a domain associated with the plurality of samples,
            the vocabulary set including company-specific terms or jargon, and
            the domain-specific corpus including information indicating relatedness of a first product and a second product,
            the first product and second product having different names,
            the tokenization including converting the plurality of samples to a numerical sequence associated with the respective plurality of tokenized samples,
            the domain-specific corpus to identify a mapping of one or more terms from the plurality of samples to the respective plurality of tokenized samples;
        perform embedding of the respective plurality of tokenized samples using the domain-specific corpus to generate a sample matrix;
        determine groupings of attributes of the sample matrix using a convolutional neural network, the groupings of attributes of the sample matrix being passed to a bidirectional long short-term memory (LSTM) layer;

determine context relationships between the groupings of attributes using a LSTM technique;

select a predicted label, of a plurality of predicted labels, for the plurality of samples using a model,
wherein the predicted label is selected based on the context relationships, the groupings of attributes, and/or the plurality of samples, and
wherein the model selects, for a particular sample of the plurality of samples, one of the plurality of predicted labels based on respective scores of the particular sample with regard to the plurality of predicted labels and based on a nonparametric paired comparison of the respective scores;

determine the respective scores for the predicted label based on a Monte Carlo simulation using a dropout technique;

provide information identifying the predicted label to a user;

receive feedback associated with the particular sample from the user,
the feedback including one or more of:
information indicating whether the predicted label associated with the particular sample is correct, or
information indicating a selected label when no significant label is identified for the particular sample; and update the model based on the feedback from the user.

9. The device of claim 8, wherein the one or more processors, when identifying the plurality of samples, are to:
obtain the plurality of samples from a web site or web interface.

10. The device of claim 8, wherein the one or more processors are further to:
train the model to determine the respective scores,
wherein the model is trained using a dropout technique.

11. The device of claim 8, wherein the one or more processors are further to:
determine respective confidence values associated with the plurality of predicted labels based on the model and the nonparametric paired comparison; and
provide information indicating whether the plurality of predicted labels are associated with a threshold confidence level based on the respective confidence values and the nonparametric paired comparison.

12. The device of claim 8, wherein the one or more processors are further to:
pad the plurality of samples of textual content after performing tokenization of the plurality of samples of textual content.

13. The device of claim 8, wherein the model is trained using machine learning or artificial intelligence.

14. A non-transitory computer-readable medium storing one or more instructions, the one or more instructions comprising:
one or more instructions that, when executed by one or more processors of a device, cause the one or more processors to:
identify a plurality of samples of textual content,
wherein the plurality of samples of textual context include user-generated reviews of products;
process the plurality of samples of textual content to generate a respective plurality of tokenized samples of numerical values corresponding to segments of the plurality of samples,
wherein the processing is performed based on a vocabulary set that is specific to a domain associated with the plurality of samples,
the vocabulary set including company-specific terms or jargon,
wherein the vocabulary set that is specific to the domain includes information indicating relatedness of a first product and a second product,
the first product and second product having different names;
determine groupings of attributes of the respective plurality of tokenized samples using a convolutional neural network,
the groupings of attributes of the respective plurality of tokenized samples being passed to a bidirectional long short-term memory (LSTM) layer;
determine context relationships between the groupings of attributes using a bidirectional LSTM technique;
select a predicted label, of a plurality of predicted labels, for the plurality of samples using a model,
wherein the predicted label is selected based on the context relationships, the groupings of attributes, and/or the plurality of samples,
wherein the model selects, for a particular sample of the plurality of samples, one or a plurality of predicted labels based on respective scores of the particular sample with regard to the plurality of predicted labels and based on a nonparametric paired comparison of the respective scores;
determine the respective scores for the predicted label based on a Monte Carlo simulation using a dropout technique;
provide information identifying the predicted label to a user;
receive feedback associated with the particular sample from the user,
the feedback including one or more of:
information indicating whether the predicted label associated with the particular sample is correct, or
information indicating a selected label when no significant label is identified for the particular sample; and
update the model based on the feedback from the user.

15. The non-transitory computer-readable medium of claim 14, wherein the nonparametric paired comparison comprises a Wilcoxon Signed Rank test.

16. The non-transitory computer-readable medium of claim 14, wherein the respective scores are based on outputs of a softmax function of the model.

17. The non-transitory computer-readable medium of claim 14, wherein the one or more instructions, that cause the one or more processors to select the predicted label, cause the one or more processors to:
select the predicted label based on confidence levels associated with the predicted label.

18. The non-transitory computer-readable medium of claim 17, wherein the confidence levels are determined based on the nonparametric paired comparison.

19. The non-transitory computer-readable medium of claim 14, wherein the one or more instructions, that cause the one or more processors to select the predicted label, cause the one or more processors to:
pad the plurality of samples of textual content after performing tokenization of the plurality of samples of textual content.

20. The non-transitory computer-readable medium of claim 14, wherein the model is trained using machine learning or artificial intelligence.

* * * * *